United States Patent Office 3,746,730
Patented July 17, 1973

3,746,730
PROCESS FOR THE MANUFACTURE OF POLYENE ACIDS
Roman Marbet, Riehen, Switzerland, assignor to Hoffmann-La Roche Inc., Nutley, N.J.
No Drawing. Filed Dec. 17, 1970, Ser. No. 99,273
Claims priority, application Switzerland, Dec. 31, 1969, 19,399/69
Int. Cl. C08h 17/36
U.S. Cl. 260—413       26 Claims

ABSTRACT OF THE DISCLOSURE

A process for preparing polyene acids from polyene alcohols or esters thereof by a single oxidation reaction by silver(I)oxide in the presence of an alkali.

BACKGROUND OF THE INVENTION

By a well known process, polyene alcohols have been oxidized to yield corresponding acids. This process of oxidation has typically been a two-step process—initially oxidizing the alcohol to form the aldehyde, as for example by treatment with manganese dioxide, and then, oxidizing the aldehyde to form the desired acid. When this process has been used to oxidize an esterified alcohol, still another process step has been necessary—a third step involving saponification of the alcohol.

This oxidation process, which proceeds via three steps in the case of an esterified alcohol, has heretofore been utilized in the manufacture of vitamin A acids from the corresponding acylated alcohols. However, there has been a need for a less roundabout and expensive procedure, involving fewer process steps, for oxidizing vitamin A to a vitamin A acid. There has been a further need for a process for the manufacture of vitamin A acids which provides somewhat greater yields with less difficulty.

SUMMARY OF THE INVENTION

In accordance with the present invention, a single step, high yield process for directly oxidizing, inter alia, polyene alcohols or esters thereof into polyene acids has been developed. In the process of the instant invention, compounds of the general formula:

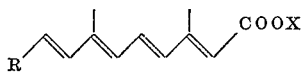

wherein R represents 2,6,6-trimethylcyclohex-1-en-1-yl,
2,6,6-trimethyl-cyclohex-2-en-1-yl,
2,6,6-trimethyl-cyclohexa-1,3-dien-1-yl,
2,6-dimethyl-hepta-1,5-dien-1-yl,
2,6-dimethyl-hepta-1,3,5-trien-1-yl, or
2-methyl-4-[2,6,6-trimethyl-cyclohex-1-en-1-yl]-buta-1,3-dien-1-yl;

and X represents hydrogen or an alkali metal; are formed by the oxidation of a compound having the general formula:

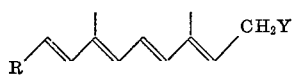

wherein R is as above; and Y represents hydroxy, alkanoyloxy or aroyloxy; with silver(I)oxide in the presence of an alkali.

DETAILED DESCRIPTION OF THE INVENTION

This invention relates to the manufacture of polyene acid compounds and particularly to the manufacture of the following vitamin A acids and analogous compounds:

all-trans-vitamin A acid,
13-cis-vitamin A acid.

α-Vitamin A acid, having the formula

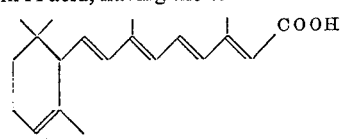

γ-Vitamin A acid, having the formula

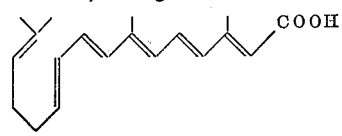

Vitamin A$_2$ acid, having the formula

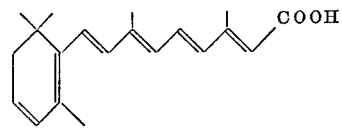

Homoisopreno-vitamin A acid, having the formula

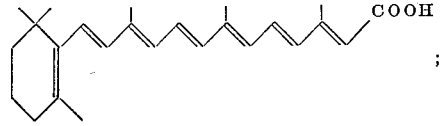

; and 3,7,11,15 - tetramethyl - hexadeca - 2,4,6,8,9,10,12,14-heptaen-1-oic acid (C$_{20}$ acid), having the formula

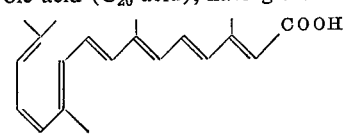

The process in accordance with the instant invention is carried out by oxidizing a polyene alcohol compound of Formula II with silver(I)oxide and alkali. This reaction can be carried out in water and/or a solvent miscible with water. If desired, where the compound of Formula I, obtained by the process of the instant invention, is an alkali metal salt, this salt may be converted into the free acid. In the instant process, the silver(I)oxide serves as the oxidizing agent while the alkali metal serves as a catalyst and to saponify the esterified vitamin A.

The alkanoyloxy groups mentioned hereinbefore, represented as Y in Formula II, preferably contain from 1 to 5 carbon atoms, such as, for example, the acetoxy or propionyloxy. However, these alkanoyloxy groups can contain 6 to 20 carbon atoms such as, for example, the palmitoyloxy or stearoyloxy. The corresponding aroyloxy groups are derived from aromatic carboxylic acids containing from 7 to 11 carbon atoms. Of these, the benzoyloxy is preferred.

The compounds of Formula II, as well as the end-products of Formula I, are known compounds. Of the acyloxy derivatives of Formula II, the acetates are preferred.

If it is desired to utilize an organic solvent, any conventional inert organic solvent, miscible with water can be utilized as the solvent medium. Suitable organic solvents which are miscible with water are alcohols, ethers and ether-alcohols. Of these solvents, the lower alchols, particularly methanol, ethanol and isopropanol, are especially preferred. Of the ethereal solvents, cyclic ethers, particularly 1,4-dioxane, have been found to be suitable. Of the ether-alcohols, 2-methoxy-ethanol and 2-ethoxy-ethanol, are also preferred.

The silver(I)oxide ($Ag_2O$) employed as the oxidizing agent may be of commercial quality or freshly regenerated moist form. In accordance with one embodiment of this invention, the silver(I)oxide can be generated in situ. For this purpose, a material capable of liberating silver-(I)oxide in situ, under alkaline conditions, is utilized. Among the materials capable of liberating silver(I)oxides are inorganic silver salts such as silver carbonate and silver nitrate.

The term "alkali" as used herein refers to alkali metal hydroxides and alkalimetal alkanolates. Of the alkali metal hydroxides the favorably priced sodium hydroxide is preferred. The alkali employed (e.g., sodium or potassium hydroxide) can be used in powder form, or dissolved in aqueous solution, in one of the water-miscible solvents mentioned hereinbefore, or in a mixture of water and a water-miscible solvent. Of the alkali solutions, an approximately 25 wt./vol. percent aqueous sodium hydroxide solution, optionally with the addition of methanol, occupies a preferred position. The alkali can, however, also be used in the form of an alkali metal alkanolate, for example as sodium methylate or sodium ethylate.

It is to be noted that the amount of alkali is in each case adapted to the starting compound of Formula II that is employed. If an acyloxy derivative of Formula II is chosen as the starting compound, at least the equimolar amount of alkali must be employed in order that the acyloxy compound be quantitatively saponified to the corresponding alcohol. However, if desired, this reaction can be carried out utilizing excess amounts of alkali.

The oxidation in accordance with the invention is expediently carried out by heating the polyene alcohol or the ester of Formula II together with silver(I)oxide or with a material capable of liberating silver(I)oxide in situ. This reaction can be carried out with alkali in water or in a water-miscible organic solvent. On the other hand, the reaction can be carried out with alkali in a mixture of water and a water-miscible organic solvent.

Further, the oxidation is expediently carried out in a protecting gas (e.g., under nitrogen gassing) in a temperature range lying between about room temperature and the boiling point of the reaction mixture. In accordance with a preferred embodiment, the reaction mixture is conveniently heated to about 40 to about 80° C. especially to about 60° C., at which temperature, the oxidation is usually completed after about 15 minutes.

The alkali salt of Formula I which is formed in the oxidation reaction, can, if desired, be converted into the free acid by acidification, expediently with a mineral acid, especially with phosphoric acid. In so doing, the free acid of Formula I usually precipitates in crystalline form. For acids which precipitate in oily form, they can be isolated in conventional manner, such as by extraction with a water immiscible solvent, for example, with an ether such as diethyl ether or with a chlorinated hydrocarbon such as methylene chloride or chloroform and then be brought to crystallization.

The silver residues formed by the oxidation of the alcohol can be converted back into silver oxide. For example, the silver residues can be dissolved in excess nitric acid and the desired silver oxide precipitated from the nitric acid-silver nitrate solution with concentrated caustic soda. The recovered silver oxide can then be expediently used again in the moist state as the oxidizing agent for a further batch.

The following examples are given as illustrations of the process of the instant invention.

Example 1

250 g. of sodium hydroxide was introduced with stirring into 1000 ml. of ion-free water. The solution was treated with 426 g. of silver(I)oxide and stirred at about 60° C. The mixture was thereupon diluted with 3000 ml. of methanol. In so doing, the temperature fell to about 45° C. While gassing with nitrogen, 250 g. of all-trans-vitamin A acetate (pure) in 500 ml. of methanol was introduced. In so doing, by self-heating the reaction temperature again rose to about 60° C. The mixture was stirred for 15 minutes and then cooled and filtered under nitrogen gassing. The silver residue was initially washed with 2000 ml. of methanol and subsequently with 1000 ml. of ion-free water. The filtrates were combined and, after dilution with 3000 ml. of tap water, treated with 2500 ml. of chloroform. With stirring and gassing with nitrogen, 350 ml. of a mixture containing 85% by weight phosphoric acid and 15% by weight water was introduced. The chloroform and aqueous phases were separated, and the aqueous methanol layer was shaken out five times with 500 ml. of chloroform each time. The combined chloroform extracts were washed three times with 1000 ml. of water each time, filtered clear, and concentrated under reduced pressure to a volume of 1000 ml. The vitamin A acid which precipitated crystalline within about 12 hours at 0° C. was filtered off and washed with 1500 ml. of chloroform cooled to −20° C. The all-trans-vitamin A acid obtained melted at 179–181° C. and was practically, analytically pure.

Further portions of impure vitamin A acid were obtained in the same way from the mother liquor concentrated to 250 ml.

The silver residues which formed in the course of the oxidation process were converted back into silver oxide as follows:

An amount of silver residue equivalent to 426 g. of silver oxide was slurried in 500 ml. of ion-free water and, expediently after the addition of an anti-foaming agent, heated with stirring to 70° C. 500 ml. of nitric acid was subsequently added dropwise to the mixture. In so doing, the silver goes into solution with the evolution of nitrous gases. The solution was filtered clear, and, with stirring, treated with a solution of 250 g. of sodium hydroxide in 500 ml. of ion-free water. The silver oxide which precipitates was washed twice with 1000 ml. amounts of ion-free water. The silver oxide obtained was usable in the moist state for a subsequent oxidation batch.

Example 2

3.28 g. of all-trans-vitamin A acetate was introduced with nitrogen gassing into a solution of 3.28 g. of potassium hydroxide in 32 ml. of water and, after the addition of 5.77 g. of silver(I)oxide, heated to 70° C. with stirring for 7 hours. The reaction mixture was treated with 100 ml. of methylene chloride and 3.28 ml. of glacial acetic and subsequently filtered. The filtrate was washed with 100 ml. of water. The methylene chloride phase was separated off and concentrated to 10 ml. The concentrate was diluted with 50 ml. of petroleum ether (boiling range 80–110° C.), again evaporated under reduced pressure to 20 ml. and cooled to −20° C. The crude all-trans-vitamin A acid, which precipitated crystalline as a brown-yellow powder, was filtered off, washed with petroleum ether and dried in vacuum. The all-trans-vitamin A acid obtained melted at 175° C.

As the following table shows, the reaction time was substantially shortened by addition of a water-miscible solvent to the batch described in Example 2:

| Solvent | Amount, ml. | Reaction time, min. | M.P. vit. A acid, ° C. |
|---|---|---|---|
| Methanol | 32 | 15 | 176 |
| Do | 100 | 15 | 175 |
| Ethanol | 32 | 15 | 175 |
| Isopropanol | 32 | 15 | 179 |
| Dioxane | 32 | 60 | 177 |
| 2-methoxy-ethanol | 32 | 15 | 179 |
| 2-ethoxy-ethanol | 32 | 30 | 180 |

The amount of water (32 ml.) employed in Example 2 was replaced by 64 ml. of methanol and, under the same conditions, all-trans-vitamin A acid was obtained which melted at 179° C.

Example 3

682 g. of silver(I)oxide was introduced with stirring into a solution of 400 g. of sodium hydroxide in 1000 ml. of water in 4800 ml. of methanol. With nitrogen gassing, the mixture obtained was treated with a solution of 400 g. of crude 13-cis-vitamin A acetate in 800 ml. of methanol. In so doing, the internal temperature rose to 62° C. After 15 minutes, the reaction solution was filtered hot. The silver residue was washed out five times with 300 ml. amounts of warm methanol each time. The combined filtrates were diluted with 5000 ml. of water and, after the addition of 500 ml. of a mixture containing 85% by weight phosphoric acid and 15% by weight water, exhaustively extracted with a total of 8000 ml. of methylene chloride. The methylene chloride extract was washed with 1600 ml. of water and concentrated to a volume of 2400 ml. at 60° C. The concentrate was diluted with 3200 ml. of petroleum ether (boiling range 80–110° C.), again evaporated to 1600 ml. under reduced pressure and cooled to 0°. The 13-cis-vitamin A acid, which precipitated crystalline after standing for 1 hour as a light brown powder, was washed with cold petroleum ether and dried in vacuum. M.P. 170–171° C. U.V. absorption spectrum (hexane): 360 nm. ($E_1^1$=1220).

Example 4

53 mg. of γ-vitamin A acetate, after the addition of 90 mg. of silver(I)oxide and a solution of 53 mg. of sodium hydroxide in 0.2 ml. of water and 0.75 ml. of methanol, was heated with stirring to 45–55° C. for 15 minutes. The reaction mixture was diluted with 10 ml. of methanol, heated to boiling for a short time and thereafter filtered. The filtrate was evaporated. The residue was dissolved in chloroform, and the chloroform solution was treated with 1500 mg. of a mixture containing 10% by weight phosphoric acid, and 90% by weight water, washed with water, dried over sodium sulfate, filtered and evaporated. The residual yellow crystalline γ-vitamin A acid melted at 135–143° C. U.V. absorption spectrum: 372 nm. ($E_1^1$=1220).

EXAMPLE 5

1.35 g. of sodium was dissolved in 64 ml. of methanol. 5.77 g. of silver(I)oxide and, subsequently, 3.28 g. of all-trans-vitamin A acetate were introduced into the solution obtained. The reaction mixture was heated to 70° C. for 150 minutes, thereafter cooled to 20° C. and, after the addition of 80 ml. of methylene chloride, treated with 30 ml. of a mixture containing 50% by weight of phosphoric acid and 50% by weight of water and 50 ml. of water. The mixture was subsequently filtered. The aqueous phase was separated off and discarded. The methylene chloride phase was washed with 50 ml. of water and evaporated. The residue was taken up in petroleum ether. Then all-trans-vitamin A acid which crystallized out in the course of 12 hours was washed with petroleum ether and dried in vacuum. M.P. 177–178° C.

Example 6

8 g. of sodium hydroxide was dissolved in 32 ml. of water. Into the resulting solution, 16 g. of silver(I)oxide and, subsequently, a solution of 8 g. vitamin $A_2$ alcohol in 160 ml. methanol were introduced. The reaction mixture was heated with stirring to 45–55° C. for 15 minutes and then filtered. The residue was washed with 50 ml. of warm methanol. The combined filtrates were concentrated to 50 ml., and the concentrate was treated with 150 ml. of water and was acidified with 20 ml. of acetic acid. The precipitated vitamin $A_2$ acid was extracted with 400 ml. of methylene chloride. The methylene chloride extract was washed with water, dried over sodium sulfate and evaporated under reduced pressure to a volume of 40 ml. The concentrate remained standing at −20° C. for 15 hours. The precipitated yellow-brown needles of vitamin $A_2$ acid were collected, washed with a little cold methylene chloride and subsequently dried under vacuum at 40° C. The pure vitamin $A_2$ acid obtained melted at 182–183° C. U.V. absorption spectrum: 365 nm. ($E_1^1$=1400).

Example 7

10 g. of potassium hydroxide were dissolved in 50 ml. of water. The solution was, after the addition of 150 ml. methanol, treated with 20 g. of silver(I)oxide and with a solution of 10 g. of vitamin A in 20 ml. of methanol. The mixture obtained was heated, with stirring, to 60° C. for 15 minutes and then filtered. The silver residue was washed with methanol. The combined filtrates were diluted with 200 ml. of water and acidified with dilute sulfuric acid to a pH of about 4. The liberated vitamin A acid was extracted with chloroform. The chloroform extract was washed with water and evaporated to a volume of 50 ml. The vitamin A acid, which crystallized after standing at −20° C., melts at 180–181° C.

Example 8

42 g. of silver(I)oxide were introduced into a solution of 100 ml. of water and 300 ml. of methanol. The mixture obtained was treated, with stirring, with 37 g. of vitamin A-3,5-dinitrobenzoate and heated to 50° C. In so doing, the internal temperature rose to 62° C. After 15 minutes the reaction solution was filtered. The silver residue was washed with 200 ml. of methanol and with 100 ml. of water. The combined filtrates were acidified with phosphoric acid to a pH of about 4. The liberated vitamin A acid was extracted with chloroform. The vitamin A acid, which was isolated from the chloroform extract, melts at 179–181° C.

What is claimed is:

1. A process for the preparation of a polyene acid compound of the formula:

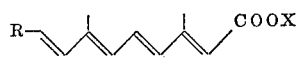

wherein R is 2,6,6-trimethyl-cyclohex-1-en-1-yl,
2,6,6-trimethyl-cyclohex-2-en-1-yl,
2,6,6-trimethyl-cyclohexa-1,3-dien-1-yl,
2,6-dimethyl-hepta-1,5-dien-1-yl,
2,6-dimethyl-hepta-1,3,5-trien-1-yl, or
2-methyl-4-[2,6,6-trimethyl-cyclohex-1-en-1-yl]-buta-1,3-dien-1-yl;

and X is an alkali metal; which comprises oxidizing a polyene alcohol compound having the formula:

wherein R is as above; and Y is hydroxy, alkanoyloxy or aroyloxy; with silver(I)oxide in the presence of an alkali.

2. The process of claim 1 wherein said oxidation is carried out with a material capable of liberating silver(I) oxide in situ.

3. The process of claim 2 wherein said material is an inorganic silver salt.

4. The process of claim 3 wherein said inorganic silver salt is selected from the group consisting of silver carbonate and silver nitrate.

5. The process of claim 1 wherein said alkali is an alkali hydroxide.

6. The process of claim 5 wherein said alkali hydroxide is selected from the group consisting of sodium and potassium hydroxides.

7. The process of claim 1 wherein said oxidation is carried out in water.

8. The process of claim 7 wherein said alkali is an alkali hydroxide.

9. The process of claim 1 wherein said oxidation is carried out in a water miscible, organic solvent.

10. The process of claim 9 wherein said alkali is an alkali hydroxide.

11. The process of claim 9 wherein said organic solvent is selected from the group consisting of the lower alcohols, 1,4-dioxane, 2-methoxy-ethanol and 2-ethoxy-ethanol.

12. The process of claim 1 wherein said oxidation is carried out in water and a water miscible, organic solvent.

13. The process of claim 12 wherein said alkali is an alkali hydroxide.

14. The process of claim 12 wherein said organic solvent is selected from the group consisting of the lower alcohols, 1,4-dioxane, 2-methoxy-ethanol and 2-ethoxy-ethanol.

15. The process of claim 1 wherein said alkali is an alkali metal alkanolate.

16. The process of claim 15 wherein said alkanolate is selected from the group consisting of sodium methylate and sodium ethylate.

17. The process of claim 1 wherein the polyene alcohol compound is an alkanoyl derivative.

18. The process of claim 17 wherein the polyene alcohol compound is an acetate derivative.

19. The process of claim 18 wherein the polyene alcohol compound is a vitamin A acetate.

20. The process of claim 19 wherein said alkali is an alkali hydroxide.

21. The process of claim 20 wherein said oxidation step is carried out in water.

22. The process of claim 20 wherein said oxidation step is carried out in a water miscible, organic solvent.

23. The process of claim 20 wherein said oxidation step is carried out in a water miscible, organic solvent and water.

24. The process of claim 1 wherein said polyene acid compound is converted into the free acid by acidification.

25. The process of claim 24 wherein acidification is carried out with a mineral acid.

26. The process of claim 24 wherein said polyene acid compound is subsequently, intimately contacted with an organic solvent, not miscible with water.

References Cited

UNITED STATES PATENTS 3,576,880  4/1971  Weedon et al. ___ 260—514 R X

LEWIS GOTTS, Primary Examiner

E. G. LOVE, Assistant Examiner